June 20, 1933.  J. F. RATH  1,914,865

METHOD AND DEVICE FOR AUTOMATICALLY REDUCING SPEED

Filed Nov. 30, 1931

J. F. Rath
INVENTOR

By: Marks & Clerk
Attys.

Patented June 20, 1933

1,914,865

UNITED STATES PATENT OFFICE

JEAN FRANCOIS RATH, OF PARIS, FRANCE

METHOD AND DEVICE FOR AUTOMATICALLY REDUCING SPEED

Application filed November 30, 1931, Serial No. 578,133, and in France December 9, 1930.

This invention has for its object a method and devices for automatically reducing speed and allowing, in a transmission between an approximately constant driving torque and a resistant torque, variations of the latter without any manipulation.

The method consists in exerting the resistant torque on the sun wheel of a differential gear having one or more planet pinions carrying, on their axis of rotation or on an axis connected to the latter and rotating simultaneously with it, one or more solids freely suspended in the space by their centre of gravity, the driving torque tending to rotate the axis of rotation of the planet pinion about an axis parallel to the axis of the sun wheel.

The accompanying drawing diagrammatically illustrates, by way of example, devices for carrying the said method into practice.

Figure 1:
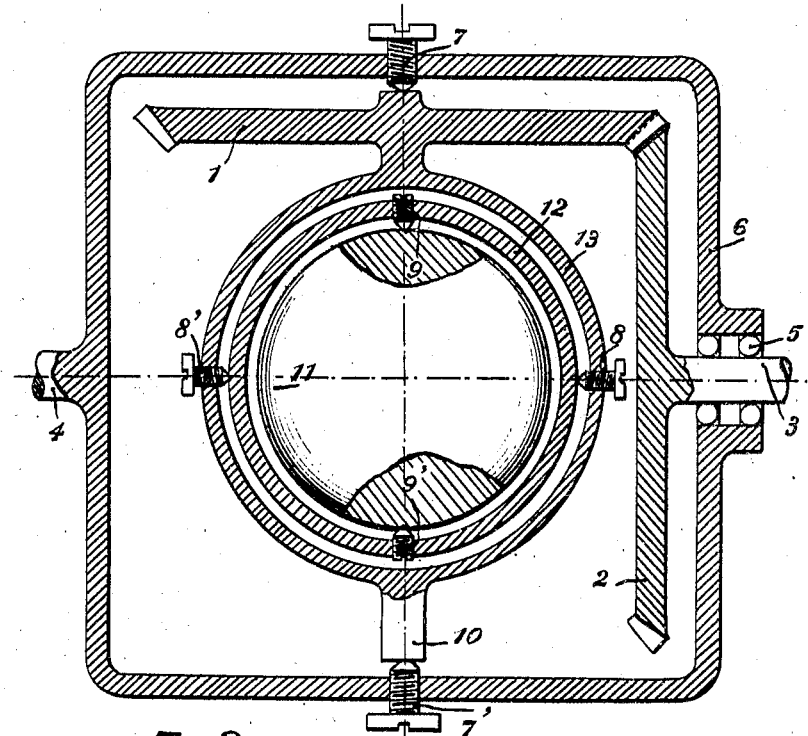
Fig. 1 illustrates a form of the device comprising on the axis of a single planet pinion a sphere hung from its centre of gravity.

As shown in Fig. 1, the planet pinion 1 is mounted on a shaft 10 capable of freely rotating on pivots 7, 7' secured on the gear case 6 which is driven by the driving torque by means of the shaft 4.

The sun wheel 2, which meshes at right angles with the planet pinion 1, is mounted on a shaft 3 to which the resistant torque is applied.

The shaft 3 rests on the gear case 6 through the medium of a ball bearing 5 or of any other means.

The sphere 11 is connected to the shaft 10 through the medium of two metal rings 12 and 13. It rotates within the ring 12 through the medium of pivots 9, 9' and this ring itself rotates within the ring 13 through the medium of other pivots 8, 8'.

Figure 2:
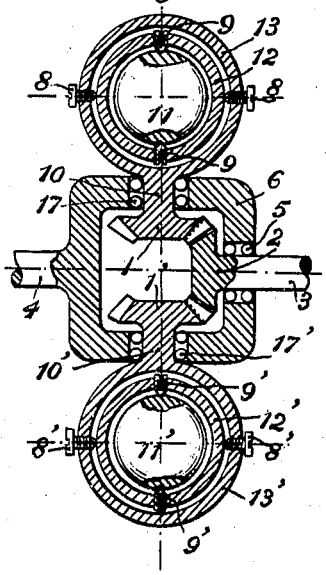
Fig. 2 illustrates a modification in which two spheres are placed on the axes of two planet pinions symmetrical relatively to the sun wheel.

As shown in Fig. 2, the planet pinions 1 and 1' are mounted on shafts 10 and 10' rotating in bearings 17 and 17' and carrying spheres 11 and 11' mounted as stated with reference to Fig. 1.

Figure 3:
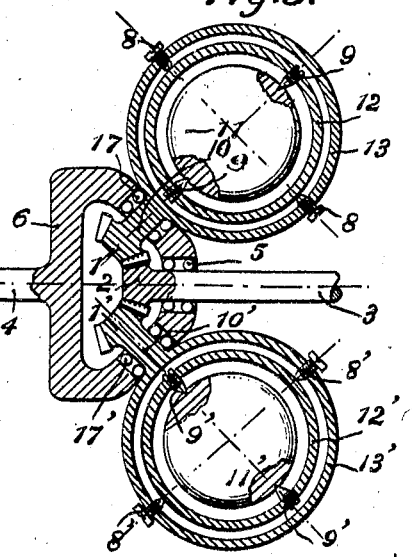
Fig. 3 illustrates a modification of the device of Fig. 2 in which the axes of the planet pinions are inclined on the axis of the sun wheel.

As shown in Fig. 3, the shafts 10 and 10' of the planet pinions 1 and 1' are inclined on the shaft 3 of the sun wheel. The rings contributing to hold the spheres can be provided in any number and these rings can rest on pivots arranged on their circumference in another manner than that shown in the drawing. Finally the number of spheres can be greater than two, and the shaft supporting the sphere or spheres may not be the shaft of the planet pinion, but a shaft gearing with the latter.

In all the forms of construction described, without the presence of one or of two spheres, the planet pinion or pinions would freely rotate about their shafts and the rotation of the gear case about the shaft 4 would not cause the rotation of the sun wheel.

In fact, the sphere tends to produce complex reactions due to a gyrostatic stress the final component of which is opposed to the rotation of the shaft of the planet pinion.

This gyrostatic effect increases with the speed of rotation of the planet pinion. Thus, for a given resistant stress, the speed of rotation of the planet pinion will increase until the torque due to the gyrostatic effect is equal to the resistant torque.

When the shaft 4 rotates, if it is assumed that there is no resistant torque on the shaft 3, the gear case 6 will rotate and the shaft 3 will be driven as if it was not directly connected to the shaft 4. If a resistant torque is exerted on the shaft 3, the planet pinion or pinions will tend to rotate about the shaft 10, but then the above mentioned gyrostatic torque will be produced and will tend to drive the sun wheel.

A stable normal working will be established and the shaft 3 will rotate less rapidly as previously.

If the resistant torque increases, the speed of the shaft 3 will further decrease and everything will take place as if a change speed gear was used without any manipulation having taken place.

The various devices for carrying the method into practice can be varied to a considerable extent. In particular, the sphere hung from rings can be replaced by any gyrostatic apparatus hung from its centre of gravity.

I claim:

A speed reducing device in a transmission of mechanical power between a driving shaft and a driven shaft, comprising a gear case rigid with the driving shaft, two pivots rigid with this gear case, a shaft capable of rotating on the said pivots, a planet gear rigid with this shaft, a sun gear meshing with the said planet gear and rigid with the shaft to be driven, a first ring rigid with the said shaft, a second ring capable of rotating relatively to the first one, a sphere capable of rotating relatively to the second ring and placed on the axis of rotation of the planet gear and on the geometrical axis of the sun gear.

The foregoing specification of my "Method and device for automatically reducing speed" signed by me this 18th day of November 1931.

JEAN FRANCOIS RATH.